May 5, 1964  G. E. REINKER ETAL  3,131,920
SECTIONALIZED CRUCIBLE
Filed April 2, 1962  2 Sheets-Sheet 1
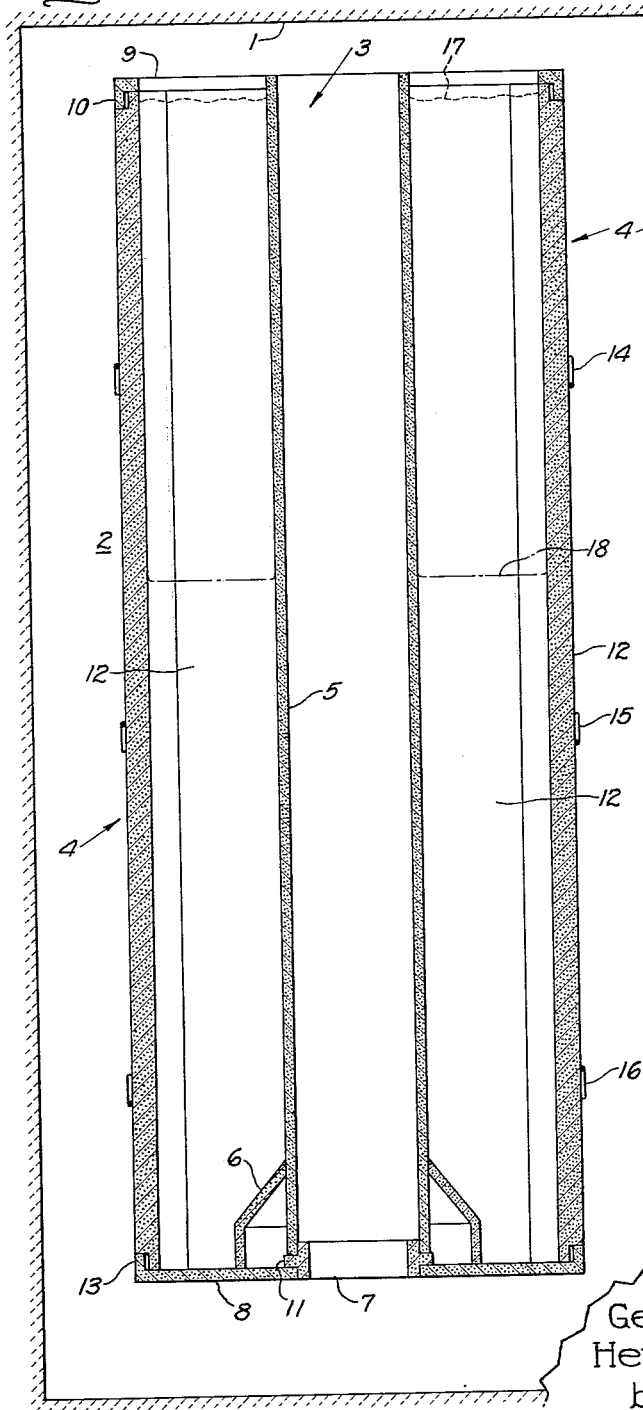
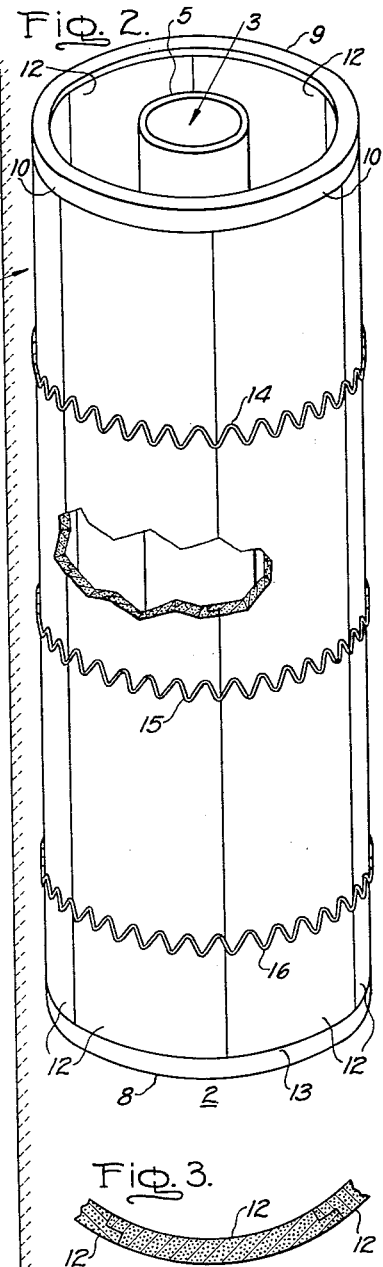
Inventors:
Gerald E. Reinker
Henry G. Richardson, Jr.
by Otto Tichy
Their Attorney

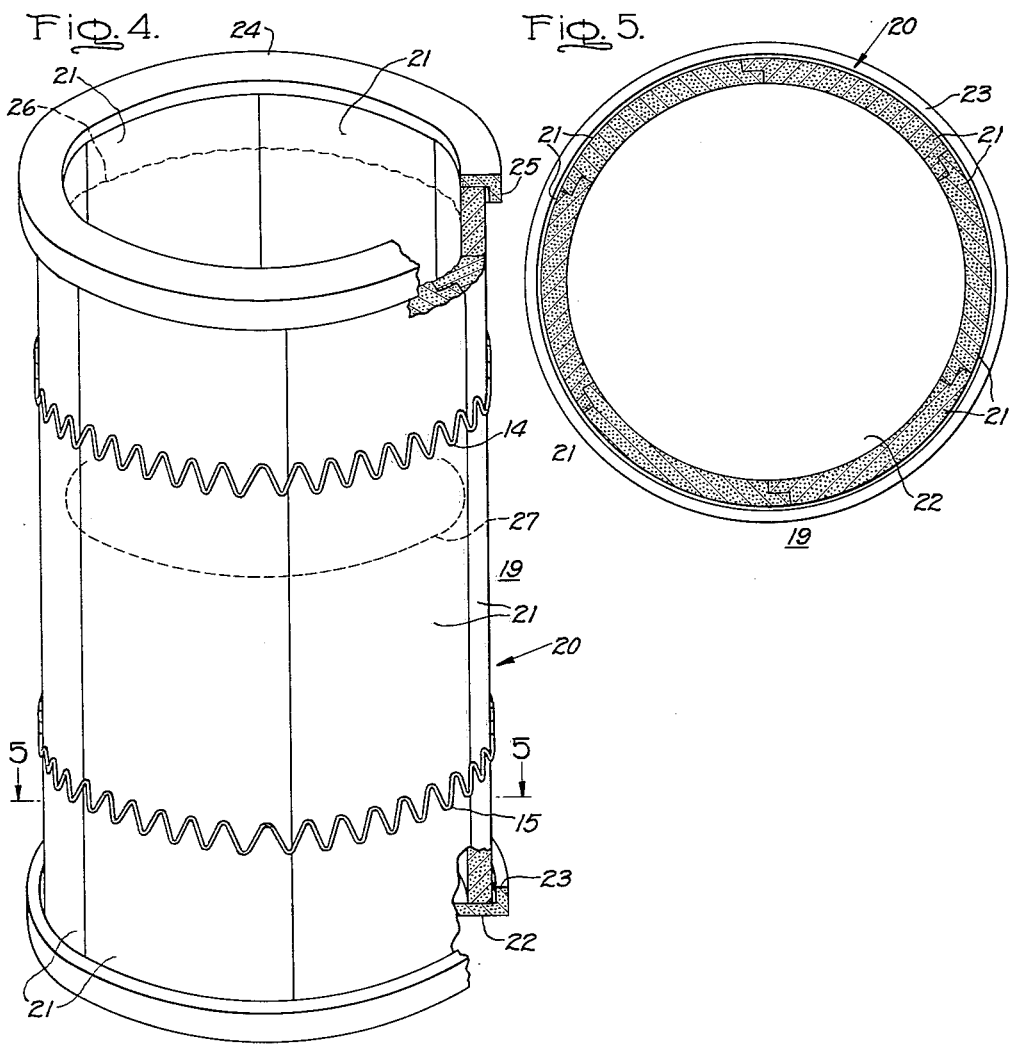

United States Patent Office 3,131,920
Patented May 5, 1964

3,131,920
SECTIONALIZED CRUCIBLE
Gerald E. Reinker, South Euclid, and Henry G. Richardson, Jr., Mentor, Ohio, assignors to General Electric Company, a corporation of New York
Filed Apr. 2, 1962, Ser. No. 184,022
4 Claims. (Cl. 263—48)

The present invention relates to the manufacture of ingots of fused vitreous silica known generally as fused quartz.

Containers or crucibles of graphite are customarily used for making ingots of fused quartz as this material is sufficiently refractory to withstand the extremely elevated temperatures to which it is subjected during fusion of a charge of crystalline quartz and is sufficiently inert with respect to silica as to reduce contamination of the fused quartz to a minimum.

Graphite crucibles of elongated cylindrical shape have been in use for more than forty years for making fused quartz. The cylindrical side wall of such crucibles has been made continuous, that is, in one piece, circumferentially of the crucible. A difficulty of long standing in connection with the fusion of crystalline quartz in graphite containers of this kind is the sticking of the graphite to the surface of the solidified fused quartz ingot which results in imperfections, such as checks, cracks, or chips in the surface of the ingot when the crucible and the ingot are separated. This is not only wasteful due to the loss in the form of chips of a certain quantity of the fused quartz from the ingot but also when it is desired to produce articles from the ingot the surface imperfections are disadvantageous.

Further, the side wall of the graphite crucible around the fused liquid quartz mass always fractures when the mass cools from the fusion temperature and solidifies to form an ingot. This is due to the fact that graphite has a higher rate of thermal expansion than the fused quartz ingot and thus contracts at a higher rate than the ingot during cooling which results in fracture of the crucible wall. Thus, a new crucible for containing the fused quartz ingot is required for each fusion which adds to the cost of producing such ingots.

In addition to the disadvantages of chipping and the like of the surface of the ingot and fracture of the side wall of the crucible while the ingot is cooling after completion of fusion, a further difficulty is breakage of the charged graphite crucible while in the furnace. This last is a most serious disadvantage because the fused quartz while liquid flows out of the crucible into the furnace with the resultant total loss of the ingot and damage to the furnace.

The above difficulties and disadvantages encountered in the production of fused quartz ingots by the use of graphite crucibles are of long standing in the art and numerous attempts have been made to avoid them without success as far as we are aware.

The principal object of the present invention is to provide a graphite crucible whereby the above difficulties of imperfections in the surface of the ingot, fracture of the side wall of the crucible during cooling of the ingot and breakage of the crucible in the furnace are avoided. Further objects and advantages of the invention will appear from the following detailed description of species thereof, from the accompanying drawings and the appended claims.

In accordance with the present invention the above difficulties encountered in the production of fused quartz ingots from crystalline quartz contained in a graphite crucible are avoided by providing a plurality of longitudinally extending expansion joints in the side wall of the crucible whereby during both the heating in the furnace of the crucible charged with crystalline quartz and during cooling of the fused quartz ingot in the crucible the build up of forces within the side wall of the crucible tending to fracture the wall is prevented by expansion of the joints in the side wall.

Thus the side wall of a graphite crucible embodying the invention is made up of a plurality of interengaged longitudinally extending sections joined together along their longitudinal edges by expansion joints.

The side wall of the crucible rests on a bottom plate in the form of a disc having a peripheral upstanding annular flange overlapping so as to encircle the lower end portion of the side wall. The crucible also includes a ring-shaped retaining member provided at its outer periphery with an annular flange overlapping so as to encircle the upper end portion of the sectionalized side wall.

The encircling flanges on the bottom plate and the ring member loosely fit the end portions of the side wall when the sections of the side wall are in close engagement with each other with the expansible joints therebetween completely closed. Thus the flanges permit outward movement of the side wall sections and expansion of the joints between these sections during the heating of the charged crucible in the furnace. However, the fit between the flanges and the end portions of the side wall is sufficiently close to limit the expansion of the joints between the side wall sections to preserve the continuity of the side wall by preventing the joints from separating completely during the heating period.

While the crucible is being charged with crystalline quartz, the side wall sections are held in close engagement with each other by an encircling hoop. The embracing effect of the hoop on the side wall is eliminated by the heat in the furnace. After the embracing effect of the hoop has been eliminated the side wall sections are free to move outwardly and the joints between the side wall sections are free to expand within the limits imposed by the flanges on the base plate and the ring member.

As a result of the different structure of the crucible of the present invention, breakage of the crucible in the furnace does not occur, imperfections in the surface of the ingot are substantially reduced and the graphite parts making up the crucible are not broken during cooling of the ingot.

The substantial reduction in the imperfections in the surface of the ingot is not explainable at present.

The elimination of breakage in crucibles of the present invention while in the furnace appears to be due to the capability of the side wall thereof to yield to forces directed against the side wall from the interior of the crucible during heating. The presence of such forces is indicated by the fact that the side of the solidified fused quartz ingot exhibits longitudinally extending slightly protruding ridges corresponding to and matching the location of the longitudinally extending expansion joints in the side wall of the crucible. It is apparent that the ridges are formed when the fused quartz is molten and flows into grooves defined by the sides of the expansion joints. It is apparent also that the sides of the expansion joints have been separated from each other during the heating a distance just sufficient to define the grooves while preserving the continuity of the side wall to prevent leakage from the crucible.

In the production of fused quartz ingots crystalline quartz, which may be in the form of either comparatively large pieces or finely divided particles, is loosely packed in a crucible which is open at the top. Packing of the quartz charge loosely in the open top crucible was intended to permit relative movement between the quartz pieces or particles during the heating in the furnace because it has been known that crystalline quartz expands on heating.

For example, when powdered crystalline quartz or crystalline quartz sand is used as the charge to be fused the charge is loosely packed in the crucible and the particle size is selected to provide at least 50% pore or open space between the grains. It appeared that in such a charge the build-up of forces directed outwardly against the walls of the crucible and of sufficient magnitude to cause fracture of the crucible wall would be avoided by slippage between the quartz pieces or particles in the charge as expansion of the particles occurred during heating. This has proven successful in all but about 5% of the crucibles so charged and used heretofore in the production of fused quartz ingots but the 5% loss or shrinkage in production of the ingots while in the furnace has persisted for many years.

From the fact that the sections of the side wall of crucibles embodying the invention are forced outwardly during the heating of the charged crucible in the furnace it is apparent that forces are built-up within the charge during the heating and are directed against the walls of the crucible. By yielding to such forces crucibles of the present invention remain intact while in the furnace.

It appears that the probable cause of the build-up of such forces in the charge which has resulted in breakage of about 5% of prior crucibles while in the furnace is the sticking together of the particles in the charge during the heating. Relative movements between the particles then does not occur an expansion of the particles and the charge constituted thereby expands in all directions as a solid body. The walls of the crucible also expand during the heating but while the coefficient of expansion of graphite is higher than that of a solid body of fused vitreous quartz it is lower than the coefficient of expansion of a charge constituted of crystalline quartz particles stuck together while the crystalline quartz of the particles changes in crystalline form with the decrease in density and the increase in volume characteristic of crystalline quartz as the temperature thereof is increased through the range of about 550° C. to about 1750° C. and higher.

At a temperature of 573° C. crystalline quartz changes in form from alpha to beta quartz with a sudden decrease in density and a sudden increase in volume. With increase in temperature over the range of about 450° C. to about 600° C. crystalline quartz increases in volume about 2.5% whereas the increase in volume of graphite over this range is about 0.8%. Obviously a solid body constituted by quartz particles stuck together while the crystalline quartz of the particles changes from alpha to beta form would swell in all directions and exert force against the walls of a graphite crucible confining the charge. Crystalline quartz assumes other forms of still lower density and higher volume as the temperature thereof increases from 600° C. toward the fusing temperature of quartz. Graphite crucibles embodying the present invention are capable of adapting to all such increases in volume in the contained crystalline quartz as these occur during the heating thereof and thus remain intact while in the furnace.

The graphite sections constituting the side wall of the crucible are not broken during cooling of the ingot in spite of the fact that the walls of the crucible contract at a faster rate during cooling than the fused quartz ingot because the sections of the side wall are free for relative circumferential movement while contracting during cooling. The joints between the side wall sections may open during the cooling of the ingot but by the time the joints have opened the ingot has cooled and solidified sufficiently to be self-supporting. Thus, these parts of the crucible are reusable for the production of additional ingots to effect substantial savings in production costs.

In the drawings accompanying and forming part of this specification species of crucibles embodying the invention are shown in which:

FIG. 1 is a vertical sectional view of one species of crucible; the electric furnace in which the crucible is placed for melting the crystalline quartz contained in the crucible is indicated by the single line box.

FIG. 2 is a perspective view of the crucible shown in FIG. 1.

FIG. 3 is a fragmentary top sectional view of the side wall of the crucible shown in FIG. 1.

FIG. 4 is a perspective view of another species of crucible embodying the invention.

FIG. 5 is a top sectional view taken along the line 5—5 of FIG. 4.

As the furnace 1 shown in FIG. 1 constitutes no part of the present invention and is of known structure further illustration and description thereof has been omitted as being unnecessary for a complete understanding of the invention. The furnace may be of the resistance heater type having vacuum connections and connections for filling the furnace interior with inert gas, such as nitrogen under pressure, to reduce the presence of bubbles in the fused vitreous quartz ingot as well known in the art. A furnace of this type is disclosed in U.S. Patent 1,536,821.

The crucible 2 shown in FIGS. 1 and 2 of the drawings is constituted of pure graphite and is suitable for the production of fused vitreous quartz ingots of cylindrical shape having an axial bore. Accordingly, the crucible provides an annular space between the inner cylindrical wall 3 and the outer cylindrical wall 4 thereof for accommodating a charge of crystalline quartz to be fused to form the hollow ingot. The inner wall 3 of the crucible is concentric with the outer wall 4, is made up of three graphite members 5, 6 and 7 and rests on the annular base plate 8 of the crucible 1. The outer cylindrical wall 4 is made up of a flat retaining ring 9 having an integral flange 10 at its outer periphery and six interengaged elongated curved wall sections 12 of each of the same size and shape also resting on the base plate 8. The retaining ring 9 rests on the interengaged wall sections 12.

The member 6 of the inner wall 3 is generally cone-shaped at its upper end and generally cylindrical at its lower end and rests on the base plate 8. The member 5 is tubular in shape and rests on the annular flange 11 of the coupling ring member 7 which is set into the opening in the base plate 8 with the flange 11 resting on the plate 8.

The longitudinal edges of the wall sections 12 of the outer wall 4 are joined together by rabbet joints. These joints between the sections 12 are made by shiplapping the sections, that is, both longitudinal edges of each section are provided with grooves but on opposite sides of the section, as shown in FIG. 3, so that the inner and outer surfaces of the wall sections are flush as shown in this figure and in FIG. 2. The joint between the flat ring 9 having flange 10 and the part of the outer wall 4 constituted by the assembled panels 12 as well as the joints between the assembled sections 12 and the integral flange 13 on the outer periphery of annular base plate 8 also are rabbet joints. In order to form such joints each end edge of each of the wall sections 12 has an arcuate groove opening toward the outer surface of the sections for accommodating the flange 13 on the base plate 8 and the flange 10 on the flat ring 9. Thus, the outer wall 4 of the assembled crucible is a continuous wall having both inner and outer surfaces flush throughout the length of the wall.

It will be noted from FIG. 1 of the drawing that the parts of the arcuate grooves in the end edges of the wall sections 12 overlapped by the flange 10 and the flange 13 in the assembled crucible are spaced slightly inward of these flanges to provide annular expansion spaces around the part of the crucible constituted by the wall sections 12. During charging of the crucible with crystalline quartz to be fused the wall sections 12 are spring-biased together by the wire springs 14, 15 and 16 of crimped molybdenum wire, for example, to hold the sections in close interengagement with each other. Thus, after the crucible has been charged and before the fusion process starts the annular expansion spaces are present.

The charge of crystalline quartz particles fills the annular space between the inner wall 3 and the outer wall 4 of the crucible up to about the level of the broken line 17 shown in FIG. 1. After fusion of the charge has been completed in the furnace the crucible is filled only to about the line 18 by the liquid fused quartz which on cooling and solidification constitutes the fused quartz ingot. Thus, the lower part of the crucible serves as a mold for casting the hollow elongated fused quartz ingot. Such ingots may be used in the production of hollow shapes or tubing of fused vitreous quartz may be drawn from the ingot by the method and apparatus disclosed and claimed in U.S. Patent No. 2,852,891, patented September 23, 1958, by Henri J. C. George.

During the heating of the charged crucible in the furnace the wire springs 14, 15 and 16 are annealed and lose their resilient properties. As a result, these springs drop off the crucible and fall to the bottom of the furnace leaving the part of the crucible constituted by the wall sections 12 free to expand outwardly. On removal of the crucible 2 from the furnace 1 and disassembly of the crucible the solidified ingot exhibits longitudinally extending ridges extending along its outer surface at locations corresponding to the rabbet joints between the wall sections 12. Thus, it is apparent as pointed out above that while the fused quartz is still liquid the rabbet joints between the wall sections 12 are in an expanded condition and that the expansion of the joints has occurred sometime during the heating which changes the charge of crystalline quartz particles to a thick liquid of fused vitreous quartz. The expansion of the rabbet joints between the wall sections 12 is limited however by the flange 13 on the base plate 8 and the flange 10 on the flat ring 9 which overlap the grooved upper edges of the sections 12 so that the rabbet joints between the sections 12 do not open completely while the fused quartz is liquid and the liquid quartz does not flow out of the crucible and into the furnace.

On cooling, the liquid fused quartz solidifies to form the ingot as pointed out above. As the coefficient of thermal expansion of graphite is higher than that of fused quartz, the wall sections 12 contract faster than the ingot. In prior crucibles the part surrounding the solidified ingot has always cracked during cooling due to the hoop stress on this crucible part resulting from this difference in the thermal expansion characteristics of these different materials. This of course cannot take place with the sectionalized crucible of the present invention because the hoop stress is eliminated since the individual wall sections 12 are free to separate from each other while contracting.

The wall sections 12 thus are physically intact after removal from the solidified quartz ingot and are reusable for additional fusions along with the retaining ring 9 of the crucible.

The crucible 19 shown in FIGS. 4 and 5 of the drawings is suitable for the production of solid cylindrical fused quartz ingots and also is constituted of pure graphite. The crucible 19 has a cylindrical side wall 20 comprising a plurality of wall sections 21 upstanding on a disc-shaped base plate 22 provided with an integral circular flange 23. The side wall 20 includes a retaining ring 24 also provided with an integral circular flange 25 at its outer periphery. Wire springs 14 and 15 of the same structure as the springs 14, 15 and 16 shown in FIGS. 1 and 2 and described above are used to hold the wall sections 12 closely interengaged during charging of the crucible with crystalline quartz sand. The wall sections 21 are similar to the wall sections 12 shown in FIGS. 1, 2 and 3 of the drawings and described above in that the longitudinally extending edges thereof are shiplapped and the joints therebetween are expansible rabbet joints. However, the arcuate grooves in the end edges of the wall sections 12 are not present in the wall sections 21 of this embodiment of the invention.

As shown in FIG. 4 the flanges 23 and 25 of the base plate 22 and the retaining ring 24, respectively, encircle the end portions of the part of side wall 20 constituted by the interengaged wall sections 21. The inner diameter of the circular flanges 23 and 25 is slightly larger than the outer diameter of these end portions when the rabbet joints between the wall sections 21 are completely closed by being pressed tightly together by the springs 14 and 15, as shown in FIG. 5. Thus, in this embodiment also an annular expansion space is provided for the cylindrical sectionalized wall 20 of the crucible 19 while the charged crucible is being heated in the furnace.

In charging the crucible 19 the quartz sand is poured into the crucible through the open ring 24 and fills the space in the crucible about to the level of the broken line 26 shown in FIG. 4 of the drawings. The charged crucible is then placed in an electric resistance type furnace of the type described above in connection with FIGS. 1, 2 and 3 and the temperature gradually increased in the furnace to the fusion temperature of the quartz sand to form the fused quartz ingot. After the crystalline quartz sand has been fused the crucible 19 is filled by to about the level of the line 27 by the fused vitreous quartz. After cooling the crucible is disassembled to remove the solidified fused quartz ingot and the parts thereof are reusable as described above in connection with the embodiment of FIGS. 1 to 3.

While species of crucibles embodying the invention have been shown and described it will be understood that changes therein may be made by those skilled in the art without departure from the spirit and scope of the invention as defined in the appended claims, for example, the wire springs 14, 15 and 16 may be omitted and other means, such as adhesive tapes of organic materials, which tapes are destroyed during the heating, may be substituted therefor to hold the wall sections 12 and 21 in close interengagement during charging of the crucible. Also, the parts of the crucibles may be changed in shape and in number with the outer wall of the crucible around the fused quartz ingot provided with longitudinally extending expansible joints as described above.

What we claim as new and desire to secure by Letters Patent of the United States is:

1. A sectional graphite crucible for the fusion of crystalline quartz comprising a base member and a side wall upstanding on said base member, said side wall comprising a plurality of interengaged longitudinally extending sections joined together along their longitudinal edges by expansible rabbet joints and a retaining member superposed on the interengaged side wall sections, said base member and said retaining member having integral flanges overlapping the interengaged side wall sections, said flanges being spaced outwardly from said side wall sections when the joints between said side wall sections are completely closed to provide space for limited expansion of the rabbet joints between said wall sections and outward movement of said wall sections on expansion of quartz crystals heated in the crucible, said flanges being adapted for closely fitting about the interengaged side wall sections, when said joints are expanded and said side wall sections move into said expansion space, to maintain the continuity of the side wall circumferentially for containing molten fused quartz within the crucible.

2. A sectional graphite crucible for the fusion of crystalline quartz comprising a base member, an outer side wall and an inner wall, said walls being upstanding on said base member and being separated from each other laterally to provide space therebetween for accommodating a charge of crystalline quartz to be fused, the said outer wall comprising a plurality of interengaged longitudinally extending sections joined together along their longitudinal edges by expansible rabbet joints and a retaining member superposed on the interengaged outer wall sections, said base member and said retaining member having integral flanges overlapping the interengaged outer wall sections, said flanges being spaced outwardly from said outer wall sections when the joints between the wall sections are completely closed to provide space for limited expansion of the rabbet joints between said wall sections and the outward movement of said said wall sections on expansion of quartz crystals heated in the crucible, said flanges being adapted for closely fitting about the interengaged outer wall sections, when said joints are expanded and said outer wall sections move into said expansion space, to maintain the continuity of the outer wall circumferentially for containing molten fused quartz within the crucible.

3. A sectional generally cylindrical graphite crucible for the fusion of crystalline quartz comprising an annular base member, an outer cylindrical side wall and an inner cylindrical wall, said walls being upstanding on said base member and being separated from each other laterally to provide an annular space between the opposed surfaces thereof for accommodating a charge of crystalline quartz to be fused, the interior of the inner cylindrical wall being in communication with the opening in said annular base member, the said side wall comprising a plurality of interengaged longitudinally extending sections joined together along their longitudinal edges by expansible rabbet joints and a ring-shaped retaining member superposed on the interengaged side wall sections, said base member and said ring-shaped member having integral flanges encircling the interengaged side wall sections, said flanges being spaced outwardly from said side wall sections when the joints between the said wall sections are completely closed to provide space for limited expansion of the rabbet joints between said wall sections and outward movement of said wall sections on expansion of quartz crystals heated in the crucible, said flanges being adapted for closely fitting about the interengaged side wall sections, when said joints are expanded and said side wall sections move into said expansion space, to maintain the continuity of the side wall circumferentially for containing molten fused quartz within the crucible.

4. A sectional generally cylindrical graphite crucible for the fusion of crystalline quartz comprising a disc-shaped base member and a cylindrical side wall upstanding on said base member, said side wall comprising a plurality of interengaged longitudinally extending sections joined together along their longitudinal edges by expansible rabbet joints and a ring-shaped retaining member superposed on the interengaged side wall sections, said base member and said ring-shaped member having integral flanges encircling the interengaged side wall sections, said flanges being spaced outwardly from said side wall sections when the joints between the sections are completely closed to provide space for limited expansion of the rabbet joints between said wall sections and outward movement of said wall sections on expansion of quartz crystals heated in the crucible, said flanges being adapted for closely fitting about the interengaged side wall sections, when said joints are expanded and said side wall sections move into said expansion space, to maintain the continuity of the side wall circumferentially for containing molten fused quartz within the crucible.

References Cited in the file of this patent

UNITED STATES PATENTS

| 82,491 | Chase | Sept. 29, 1868 |
| 1,393,195 | Bradley | Oct. 11, 1921 |
| 1,904,932 | Rutten | Apr. 18, 1933 |
| 2,903,876 | Nannini | Sept. 15, 1959 |

FOREIGN PATENTS

| 106,547 | Great Britain | May 13, 1917 |